United States Patent [19]

Ebihara et al.

[11] 4,227,192

[45] Oct. 7, 1980

[54] DRIVE SYSTEM FOR LIQUID CRYSTAL DISPLAY DEVICE

[75] Inventors: Heihachiro Ebihara; Fukuo Sekiya, both of Tokorozawa; Takashi Yamada, Sayama, all of Japan

[73] Assignee: Citizen Watch Co., Ltd., Tokyo, Japan

[21] Appl. No.: 909,889

[22] Filed: May 26, 1978

[30] Foreign Application Priority Data

May 31, 1977 [JP] Japan ................................ 52-63560

[51] Int. Cl.[2] ................................................ G06F 3/44

[52] U.S. Cl. .................................... 340/765; 340/713; 340/805

[58] Field of Search ................ 340/756, 765, 713, 805

[56] References Cited

U.S. PATENT DOCUMENTS

| | | | |
|---|---|---|---|
| 3,911,426 | 10/1975 | Mouton et al. | 340/765 |
| 4,060,802 | 11/1977 | Matsuki | 340/765 |
| 4,065,764 | 12/1977 | Houryu | 340/765 |
| 4,076,385 | 2/1978 | Kondo | 340/765 |
| 4,142,182 | 2/1979 | Kmetz | 340/765 |

*Primary Examiner*—Marshall M. Curtis

*Attorney, Agent, or Firm*—Jordan and Hamburg

[57] ABSTRACT

Drive signals are applied to the segment and digit electrodes of a liquid crystal display device in a time-multiplexed manner by means of a control circuit adapted to control first and second gates the output of one of which is selected as a segment signal by selection means, and further adapted to control a digit signal generating circuit for producing a digit signal that cooperates with the segment signal to drive the display. The effective application of drive signals allows a reduction in the number of segment electrodes and in the quantity of associated wiring so that the degree of integration on an IC chip can be increased.

12 Claims, 12 Drawing Figures

DRIVE SYSTEM FOR LIQUID CRYSTAL DISPLAY DEVICE

This invention relates to a drive system for driving a liquid crystal display device and, more particularly, to a drive system for driving a matrix type liquid crystal display device.

In recent years, liquid crystal display devices have been increasingly used in various applications such as electronic timepieces, desk calculators, etc., because of low power consumption. It is known in the art that there are two types of arrangements for the electrodes of the liquid crystal display devices, i.e., a static type arrangement and a matrix type arrangement. In the static type arrangement, the liquid crystal display device comprises a common electrode and a plurality of groups of segment electrodes displaced from and disposed opposite the common electrode. The segment electrodes of each group are not interconnected and independently driven from each other. This arrangement is advantageous in that a driver circuit for each segment electrode can be manufactured in a simple construction. However, this has drawbacks in that a number of driver circuits are required and increases the number of leads from the liquid crystal display device, increasing packaging cost and complexity.

In the matrix type arrangement, the liquid crystal display device comprises a plurality of digit electrodes, and a plurality of segment electrodes displaced from and disposed opposite all of the digit electrodes. The segment electrodes relative to each digit electrode are interconnected, and the digit electrodes are provided independently from each other. Generally, the digit electrodes are driven in a time multiplexed relationship. With this arrangement, the number of leads from the liquid crystal display device is remarkably reduced, representing a considerable saving in packaging cost and complexity. However, this suffers from drawbacks in the design of driver circuits because of its inherent complexity in the circuitry.

It is, therefore, an object of the present invention to provide a drive system for driving a matrix type liquid crystal display device which can overcome the shortcomings encountered in the prior art.

It is another object of the present invention to provide a drive system for a matrix type liquid crystal display device, which system is simple in circuit arrangement.

It is still another object of the present invention to provide a drive system for a matrix type liquid crystal display device, which system occupies a minimum space and overcomes wiring problems encountered in the prior art.

Figure 1:
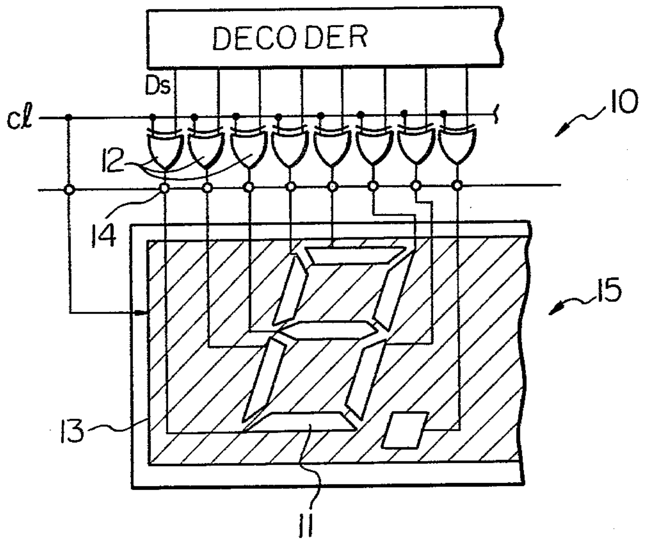
Fig. 1 PRIOR ART
FIG. 1 is a circuit diagram of a portion of a drive circuit for a liquid crystal display device according to the prior art.

FIG. 1 illustrates the static-type driver circuit 10 of the prior art. In FIG. 1, display segment electrodes 11 are connected to a driver circuit composed of Exclusive OR gates 12, to receive a periodic voltage signal Cl being applied to each Exclusive OR gate 12 and common electrode 13 in order to drive a display device 15. The terminals 14 and associated wiring for the connections between the OR gates 12 and segment electrodes 11 occupied a large area on an IC chip owing to the large number of terminals and the quantity of wiring.

Figure 2A:
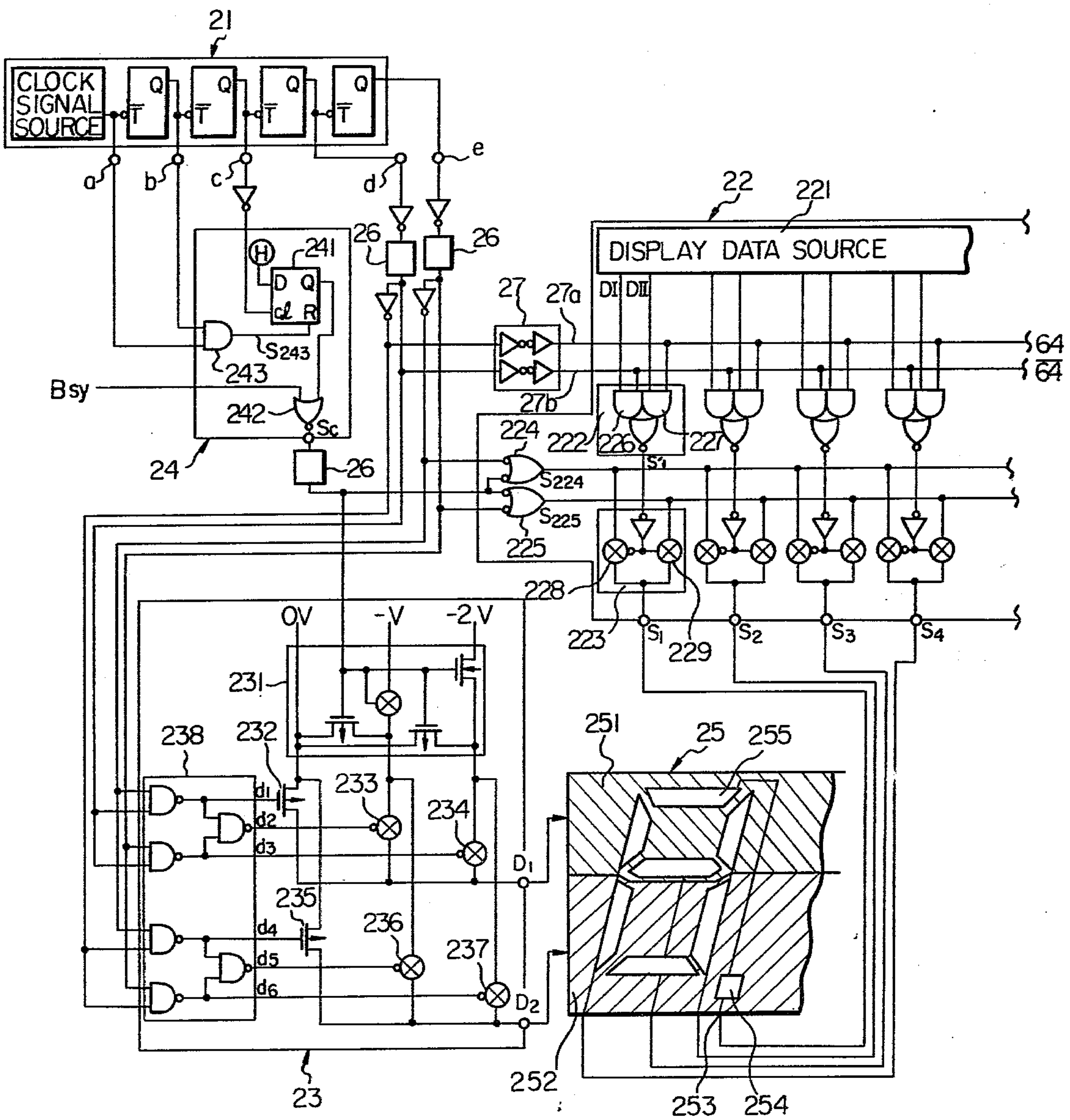
FIG. 2A is a circuit diagram of a preferred embodiment of a drive system according to the present invention.

FIG. 2A shows a preferred embodiment of a drive system according to the present invention which provides an improvement over the circuit shown in FIG. 1. Designated at 21 is a source of periodic signals composed of a plurality of flip-flops to provide periodic signals a to e which are the signals frequency divided at a ratio of 1/2N where N is an integer, with the periodic signals being used to generate digit and segment signals that drive a matrix type liquid crystal display device 25. A segment signal generating circuit 22 has a display data source 221, a first selector 222, second selector 223, and gate circuit means composed of a first gate 224 and a second gate 225, coupled to receive one of the periodic signals and the inverse thereof, and controlled by a control signal $S_c$ to either pass the periodic signal or to provide an output at a fixed potential. The segment signal generating circuit produces segment signals $S_1$, $S_2$, . . . $S_n$; applied to corresponding segment electrodes in a manner to be described later. A digit signal generating circuit 23 has a distribution circuit 231 connected to a power source that determines the potential levels of the digit signals, switching elements 232, 233, 234, 235, 236, 237 connected to the output terminals of distribution circuit 231, and a switch control circuit 238 adapted to control the switching elements. The digit signal generating circuit 23 is thus adapted to produce two digit signals $D_1$, $D_2$ in a manner to be described later. A control circuit 24 is adapted to produce a control signal $S_c$ that controls the digit and segment signal generating circuits. The liquid crystal display device 25 comprises digit electrodes 251 and 252 and a plurality of segment electrodes 253 arranged in a matrix array to display numerals, characters or symbols as dictated by the digit and segment signals. Designated at 26 is a level shifter, and at 27 a buffer circuit. A switching element 228, as well as the switching elements 233, 234, 236, 237, is a bi-directional switch that conducts in either direction when a minimum potential is applied to the control input terminals. A switching element 229 is a bi-directional switch that conducts in either direction when a maximum potential is applied to the control input terminals. Distribution circuit 231 controls the potentials applied to the input terminals of all the switching elements 233, 234, 236, 237, and accomplishes this by means of the control signal $S_c$. Three reference voltages, namely OV, $-V$ and $-2V$ are applied to input terminals of the distribution circuit 231, as shown in FIG. 2A. The potential difference between reference voltages OV and −2V is greater than the threshold voltage level at which a display segment of the liquid crystal display device is excited to become visible. The potential difference between reference voltages OV and −V is less than this threshold level. The reference voltage OV is connected to input terminals of control elements 232 and 235. The reference voltage OV is applied from an output terminal of distribution circuit 231 to input terminals of switching elements 233 and 236 when control signal $S_c$ is at a low voltage level, while the reference voltage −V is applied to the input terminals of switching elements 233 and 236 when control signal $S_c$ is at a high voltage level. The reference voltage OV is applied from an output terminal of distribution circuit 231 to input terminals of switching elements 234 and 237 when control signal $S_c$ is at a low voltage level, while the reference voltage −2V is applied to he input terminals of switching elements 234 and 237 from distribution circuit 231 when control signal $S_c$ is at a high voltage level.

Figure 2B:
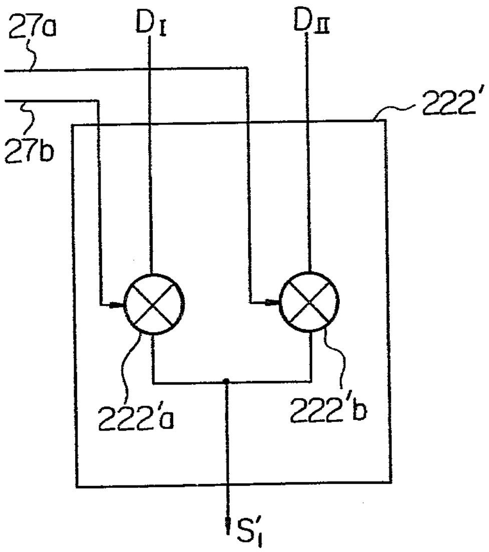
FIG. 2B is a circuit diagram of a modification of a first selector shown in FIG. 2A.

The switching elements 232, 235 conduct when a minimum potential is applied to the control input terminals and are unidirectional in the present embodiment as shown in FIG. 2A. In FIG. 2A, while the first selector 222 is shown as comprising AND gates 226, 227 and NOR gate, the first selector may be modified as shown in FIG. 2B, in which the selector 222′ comprises switching elements 222′*a* and 222′*b* adapted to be controlled by outputs 27*a*, 27*b* from buffer circuit 27.

A description will now be had with respect to the signals that are produced by each of the circuits. The output signals that appear at the output terminals a, b, c, d, and e of the periodic signal source 21 will be describe as having frequencies of 512 Hz, 256 Hz, 128 Hz, 64 Hz and 32 Hz, respectively.

Figure 3:
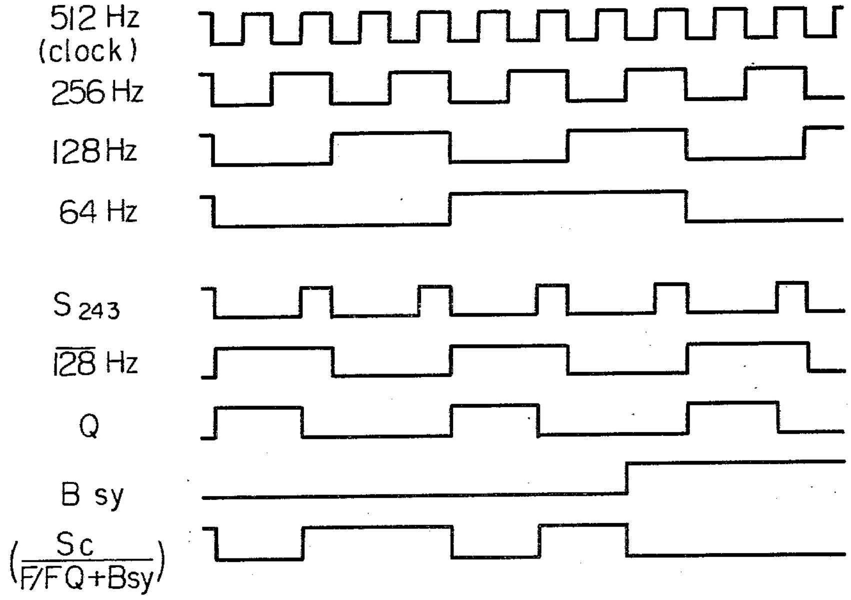
FIG. 3 is a waveform diagram of control signals used in the system shown in FIG. 2.

With regard to control signal $S_c$, control circuit 24 is composed of a data-type flip-flop (hereinafter referred to as D-FF) 241, a NOR gate 242 and an AND gate 243 according to the present embodiment. A high potential is applied to the data input terminal of D-FF 241, a $\overline{128}$ Hz signal which is the inverted version of the 128 Hz periodic signal is applied to the clock input terminal, and a signal S243 from the output side of AND gate 243, having the 512 Hz and 256 Hz signals as inputs, is applied to the reset input terminal. The output Q of D-FF 241 and a data transmission timing signal Bsy are coupled to the input side of NOR gate 242 which produces the control signal $S_c$. The timing relationships of these signals can be seen in FIG. 3. The control signal $S_c$ simultaneously controls the potentials of the digit and segments signals which will be described later, and makes it possible to place all the digits of the display in a non-excited state. If the control signal $S_c$ can be controlled by an external control member, the display can thus be turned off when it is not necessary to read the data such as time, thereby permitting a reduction in power consumption.

As regards to segment signal $S_1$ applied to segment electrode 253, display data source 221 provides a plurality of pairs of display data signals, one pair of which is denoted as $D_I$ and $D_{II}$ in FIG. 2A. Each pair of display data signals serves to control a corresponding pair of segment electrodes, in a manner to be described hereinafter. The display data signals $D_I$ and $D_{II}$, for example, control the segment electrodes 254 and 255. Data signals $D_I$ and $D_{II}$ are selected by the first selector 222 in response to 64 Hz, 64 Hz signals from periodic signal source 21. Output signals S224, S225 from respective first and second gates 224, 225 are selected by second selector 223 depending on the output of the first selector 222. The inputs to the first gate 224 are the $\overline{32}$ Hz periodic signal and the control signal $S_c$, while the inputs to the second gate 225 are the 32 Hz signal and the control signal $S_c$.

Figure 4:
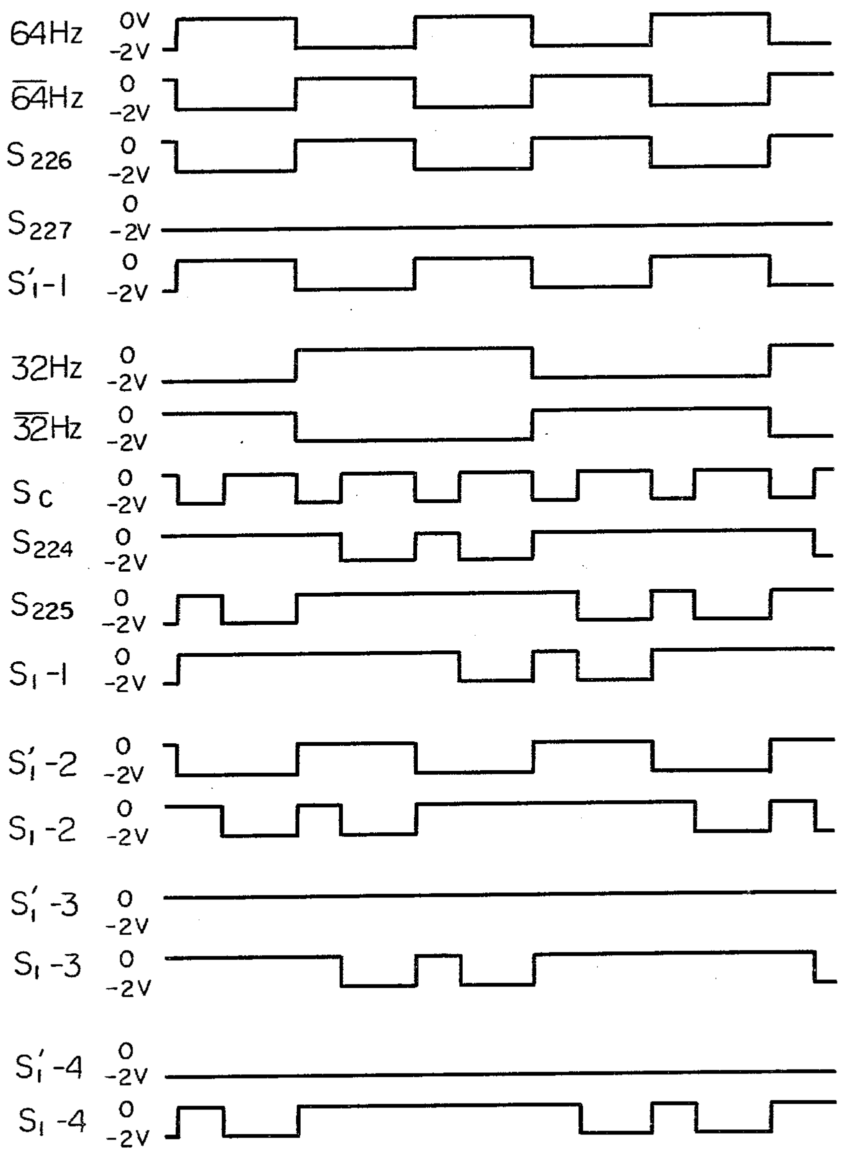
FIG. 4 is a waveform diagram of segment signals used in the system shown in FIG. 2.

Reference will now be had to FIG. 4 for a description of a situation in which display segment 254 is displayed and display segment 255 extinguished by the signals of the present embodiment. In order to obtain the voltages needed to drive the liquid crystals, the signals have a maximum potential level of OV, a minimum potential level of −2V, and an intermediate potential level of −V. If it is assumed that display data signal $D_I$ is at the OV potential and display data signal $D_{II}$ at the −2V potential, output signal S′1 from the first selector 222 is represented by the signal $S'_{1-1}$ in FIG. 4. The outputs S224, S225 of the first and second gates as selected by signal $S'_{1-1}$ are the 32 Hz, $\overline{32}$ Hz signals controlled by control signal $S_c$. The second selector 223 selects between the signals S224, S225 in response to output signal $S'_{1-1}$ and produces segment signal $S_1$ having the waveform identical to signal S224 when $S'_{1-1}$ is at the OV potential, and segment signal $S_1$ having the waveform identical to signal S225 when $S'_{1-1}$ is at the −2V potential. This segment signal can also assume the waveforms $S_{1-2}$, $S_{1-3}$, and $S_{1-4}$ depending upon the display data signals $D_I$ and $D_{II}$. According to the timing of these segment signal waveforms as they are illustrated, $S_{1-2}$ extinguishes display segment 254 and excites display segment 255, $S_{1-3}$ excites both display segments 254 and 255, and $S_{1-4}$ extinguishes both of these display segments. The other segment signals $S_2$, $S_3$, . . . . $S_n$ are produced in the same manner. From FIG. 4, it can be seen that each of the possible signals which can be produced as a segment signal, in response to the four possible combinations of voltage levels of a pair of display data signals such as $D_I$ and $D_{II}$, namely $S_1$-1, $S_1$-2, $S_1$-3 and $S_1$-4 consists of a rectangular wave signal which varies in a periodically repeated sequence between the potential levels OV and −2V, with the timing of these potential level transitions being synchronized with potential level transitions of the control signal $S_c$, and that these four possible segment signals differ in phase from one another by an amount which is determined by the timing of the control signal $S_c$.

Figure 5:
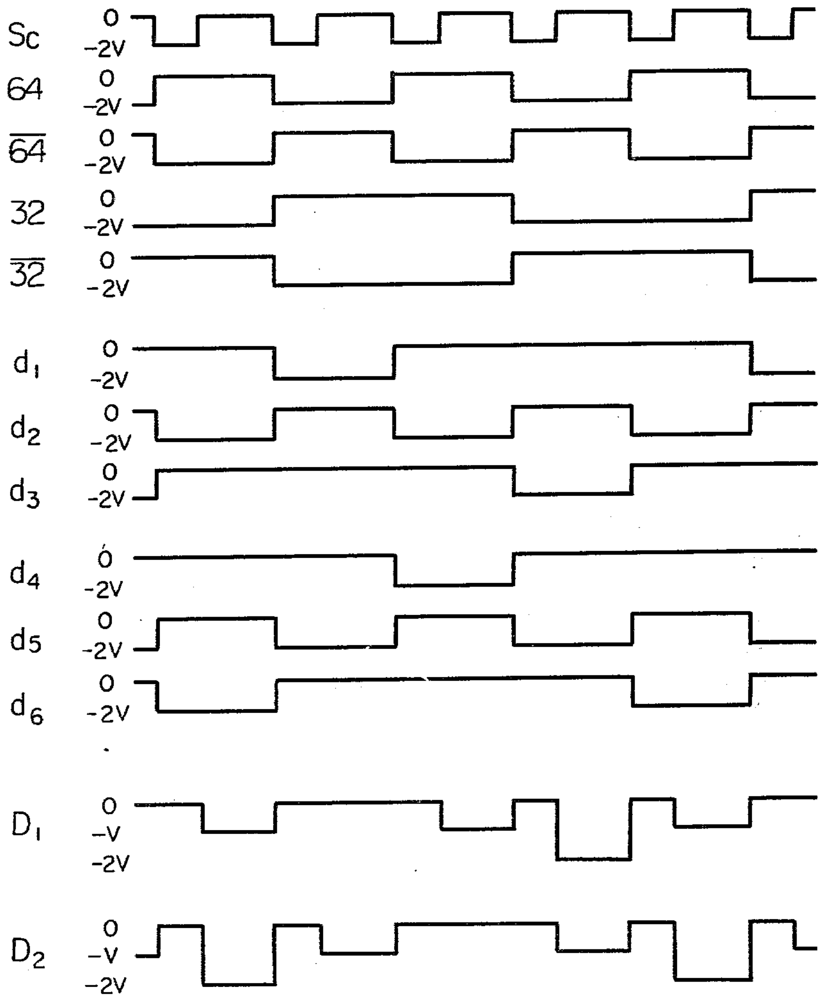
FIG. 5 is a waveform diagram of digit signals used in the system shown in FIG. 2.

The digit signals $D_1$, $D_2$ applied to digit electrodes 251, 252 are formed and act as follows. The input terminals of switching elements 232, 233, 234, 235, 236 and 237 are each applied with the first, second and third potentials OV, −V, −2V by means of the distribution circuit 231. The distribution circuit applies the OV potential to the input sides of all the switching elements when the control signal $S_c$ is at the minimum potential −2V. Switching elements 232, 233 and 234 are opened and closed by control signals $d_1$, $d_2$, $d_3$ from switch control circuit 238 so as to change the potential levels of digit signal $D_1$. Similarly, switching elements 235, 236, 237 are opened and closed by switch control signals $d_4$, $d_5$ and $d_6$ so as to change the potential levels of digit signal $D_2$. These switch control signals $d_1$ through $d_6$ are formed by utilizing the 64 Hz, 64 Hz, 32 Hz and $\overline{32}$ Hz periodic signals. The switching elements 232 through 235 conduct when the minimum potential −2V is impressed upon the control input terminals. The timing and potential levels of these signals is as illustrated in FIG. 5. It can be seen from FIG. 5 that each of the digit signals $D_1$ and $D_2$ is a rectangular waveform signal which alternates between the potential levels of OV, −V, and −2V in a periodically repeated sequence, with the repetition period being identical to the period of the 32 Hz signal, and that the periodic repetitions of signals $D_1$ and $D_2$ differ in phase by 180°.

Figure 6:
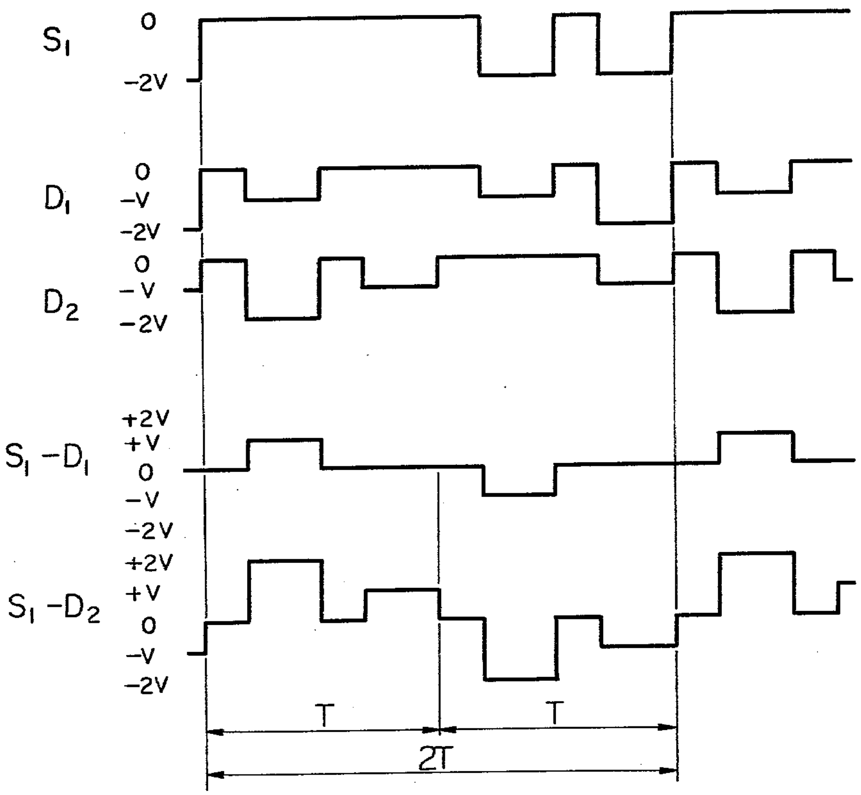
FIG. 6 is a waveform diagram of drive signals applied to a liquid crystal display device.

FIG. 6 shows the segment signal $S_1$ and digit signals $D_1$, $D_2$, produced as described above, as they are applied to a liquid crystal display device composed of display segments. FIG. 6 also shows the resulting waveforms that actually determine the state of the display segments. Signal $S_1$ is the same as the segment signal $S_{1-1}$ applied to segment electrode 253. Signals $D_1$, $D_2$ are digit signals applied to respective digit electrodes 251, 252 and to the corresponding digit electrodes of all the digits that comprise the display.

When these signals are applied to each of the electrodes, liquid crystal drive signals having the potential differences $S_1$-$D_1$, $S_1$-$D_2$ appear at the respective display segments 254, 255.

Today it is generally understood that a liquid crystal display element exhibits a characteristic curve which indicates that contrast ratio is dependent upon the rms voltage Ve of the applied drive signal. The rms voltage Ve can be obtained from the following formula:

$$Ve = \sqrt{\frac{1}{T}\int_{O}^{T} V^2 dt}$$

where T is the frame time and V is the applied potential difference.

The liquid crystal drive signals $S_1$-$D_1$, $S_1$-$D_2$ in the present embodiment possess a rectangular waveform which has a repetitive period T of 1/32 sec. and which is held at a O potential level for a duration $\frac{3}{8}$ T by the control signal $S_c$. The rms voltage $Ve_2$ of drive signal $S_1$-$D_2$ applied to display segment 254 to excite the segment is thus found from the above formula; therefore, $$Ve_2 = \sqrt{\{(2V^2) \cdot \tfrac{1}{2} + V^2 \cdot \tfrac{1}{2}\} \cdot \tfrac{5}{8}} = \tfrac{1}{4}\sqrt{25} \cdot V = \frac{5}{4} V$$

Similarly, the rms voltage $Ve_1$ of drive signal $S_1$-$D_1$ applied to display segment 255 to extinguish the segment is $$Ve_1 = \sqrt{V^2 \cdot \tfrac{1}{2} \cdot \tfrac{5}{8}} = \tfrac{1}{4}\sqrt{5}\ V$$

According to the drive system of the present embodiment, the ratio of the rms voltage $Ve_2$ of drive signal $S_1$-$D_2$ for exciting the display segment to the rms voltage $Ve_1$ of drive signal $S_1$-$D_1$ for extinguishing the display segment, namely the operation margin $Ve_2/Ve_1$ is $\sqrt{5}$.

Figure 7A:
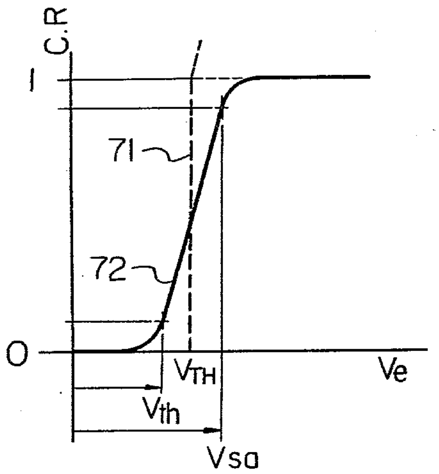
FIGS. 7A and 7B are characteristic curves useful for explaining the liquid crystal display effects.
Figure 7B:
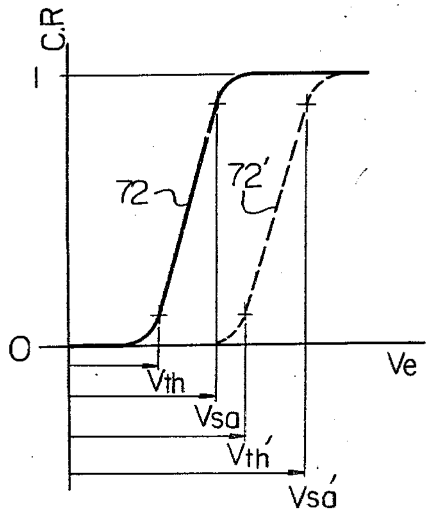

FIGS. 7A and 7B illustrate rms voltage Ve of a drive signal applied to a liquid crystal display device versus contrast ratio (CR). The broken line 71 in FIG. 7A is the ideal characteristic curve. With the threshold voltage $V_{TH}$ of the liquid crystal display element defining a boundary, the contrast ratio is O on one side of the boundary and 1 on the other side. In actual practice, however, as indicated by the solid line 72, there is an rms voltage Vth at which the display begins to appear as the rms voltage of the drive signal rises from O, and an rms voltage Vsa at which the display becomes substantially completely illuminated. In other words, the display is not fully ignited by a drive signal when its rms voltage is in the area between Vth and Vsa; hence, a display element with such a characteristic would be impractical. Accordingly, since the drive signals produced by the drive circuit of the present embodiment have an operation margin of $\sqrt{5}$ as described above, a liquid crystal display device can be driven if, according to its characteristics, $Vsa/Vth=\sqrt{5}$. Liquid crystal display devices having such characteristics are of course available today.

In FIG. 7B, a solid line 72 and broken line 72' represent discrepancies in the rising portions of the Ve-CR characteristic resulting from temperature variation or differences between manufactured lots. The present invention makes it possible to easily correct or compensate for these discrepancies by a control operation using control signal $S_c$. More specifically, this is accomplished by suitably controlling the rms voltage Ve of the drive signal.

Figure 8A:
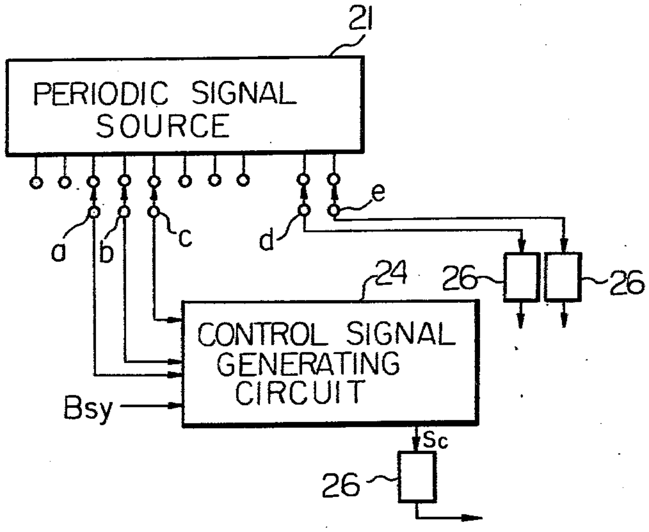
FIGS. 8A and 8B are circuit diagrams useful for explaining a portion of a control signal generating circuit.

FIG. 8A depicts a compensation circuit adapted to compensate for a discrepancy of the type shown in FIG. 7B resulting primarily from a difference in manufactured lots. The circuit enables adjustment to be performed for thereby selectively connecting particular ones of the periodic signals that are used to produce the clock signals and reset signals within the control signal generating circuit 24. Accordingly, suitably selecting periodic signals adjusts the duty cycle of the control signal $S_c$ to thereby effect control of the rms voltage Ve of the drive signal.

Figure 8B:
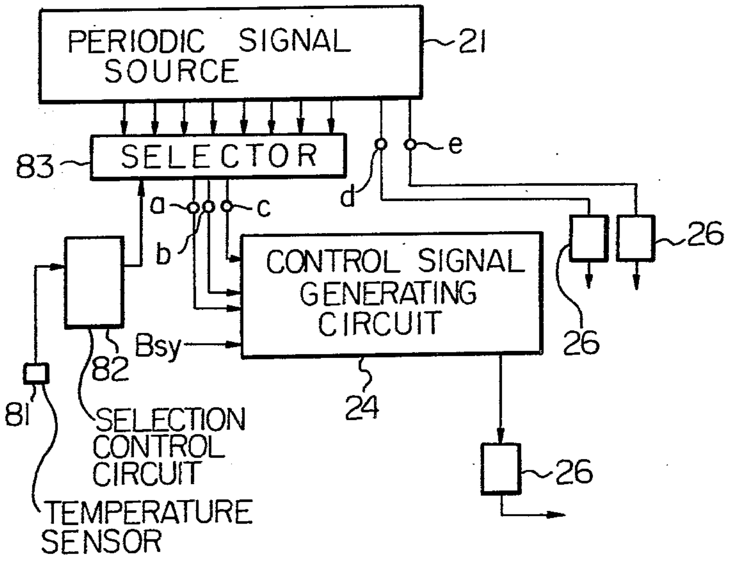

FIG. 8B depicts a compensation circuit which performs automatic compensation for the abovementioned discrepancy resulting in this case from a variation in temperature. In this instance the circuit is equipped with a temperature sensor 81, selection control circuit 82 and a selector 83 adapted to select periodic signals in response to selection signals obtained from the selection control circuit 82. These additional circuits adjust the duty cycle of the control circuit $S_c$ to control the rms voltage Ve.

Thus, as described above, the compensation circuitry cooperates with control signal $S_c$ to control the drive signals which are used to excite and extinguish the display segments of the display device. This means that the rms voltage Ve of the respective drive signals can be controlled so as to follow variations in characteristics while the operation margin remains at $\sqrt{5}$. As a result, it is possible to apply drive signals to a liquid crystal display device in a very effective manner.

Figure 9:
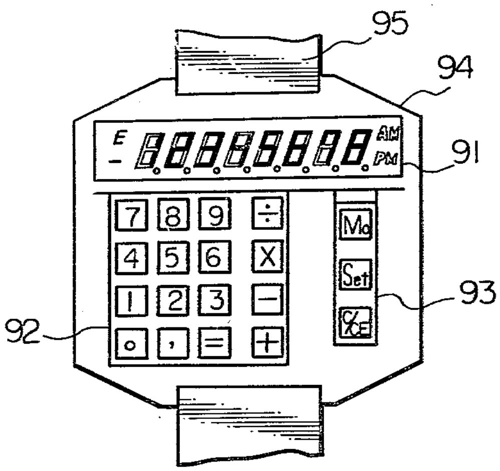
FIG. 9 shows the external appearance of a portable electronic device which employs the liquid crystal drive system of the present invention.

FIG. 9 shows the external appearance of a portable electronic device which employs a liquid crystal display drive system in accordance with the present invention. A liquid crystal display device is designated at 91, an input keyboard at 92, function keys at 93, the case of the portable electronic device at 94, and a band at 95.

According to the present embodiment of a drive system for a liquid crystal display device arranged in the form of a 2-digit matrix, the number of segment electrodes is $\frac{1}{2}$ that required for a static drive circuit. This reduction in the number of segment electrodes allows the density of integration on an IC chip to be increased. The circuitry for generating the digit and segments signals can be constructed in a comparatively simple manner. Moreover, compensation of contrast ratio can be easily accomplished since the rms voltage of the drive signals can readily be made to follow the contrast ratio and rms voltage characteristics of the liquid crystal display device. An increase in the yield of the liquid crystal display device can therefore be expected. Accordingly, the drive circuit of the present invention when employed in an electronic device lowers overall cost and reduces the overall size of the device.

What is claimed is:

1. A drive system for a matrix type liquid crystal display device having a plurality of segment electrodes positioned to define a plurality of display figures and a plurality of digit electrodes, with each of said digit electrodes being common to all of said display figures, comprising:

a periodic signal source providing a plurality of periodic signals of fixed frequency, each of said periodic signals being mutually different in frequency;

a control circuit responsive to selected ones of said periodic signals for providing a control signal;

a source of first, second and third reference voltages;

a digit signal generating circuit coupled to receive said first, second and third reference voltages, with the difference between said second and first reference voltages being greater than a threshold level of said liquid crystal display device and the difference between said third and first reference voltages being less than said threshold level, said digit signal generating circuit being responsive to said control signal and to selected ones of said periodic signals for successively applying said first, second and third reference voltages to output terminals thereof in a predetermined sequence, said predetermined sequence being cyclically repetitive, for thereby producing digit signals on said output terminals of the digit signal generating circuit to be applied to corresponding ones of said digit electrodes, with voltage level transitions of said digit signals being synchronized with voltage level transitions of said control signal;

a segment signal generating circuit composed of a display data source for producing display data signals, first selector circuit means responsive to said display data signals and selected ones of said periodic signals for providing output signals, gate circuit means controlled by said control signal for selectively passing said selected ones of the periodic signals, and second selector circuit means responsive to the periodic signals selectively passed by said gate circuit means and to said output signals from the first selector means for providing a plurality of segment signals which vary in potential between said first and second reference voltage levels, with voltage level transitions of said segment signals being synchronized with voltage level transitions of said control signal, and with each of said segment signals being applied in common to at least two of the segment electrodes of one of said display figures;

whereby selected ones of said segment electrodes are driven in a time-sharing manner by the voltage difference between said selected segment electrodes and the corresponding digit electrodes being periodically made to exceed said threshold voltage level.

2. A drive system for a matrix type liquid crystal display device according to claim 1, in which said digit signal generating circuit comprises:

distribution circuit means coupled to receive said first, second and third reference voltages, and responsive to said control signal for alternately providing said first and second reference voltages at a first output terminal thereof and for alternately providing said first and third reference voltages at a second output terminal thereof;

switch control circuit means responsive to selected ones of said periodic signals for producing control signals; and a plurality of switching elements comprising a first switching element having a control terminal coupled to receive a first one of said control signals and an input terminal coupled to receive said first reference voltage, a second switching element having a control terminal coupled to receive a second one of said control signals and an input terminal coupled to said first output terminal of the distribution circuit means, and a third switching element having a control terminal coupled to receive a third one of said control signals and an input terminal coupled to said second output terminal of the distribution circuit means, with output terminals of each of said first, second and third switching elements being connected in common to a first output terminal of said digit signal generating circuit, whereby a first one of said digit signals is produced from said first output terminal of the digit signal generating circuit.

3. A drive system for a liquid crystal display device according to claim 1, in which a pair of said display data signals designate conditions of excitation and non-excitation of a corresponding pair of display segments.

4. A drive system for a liquid crystal display device according to claim 3, in which a first combination of voltage levels of a pair of said display data signals causes a first output signal which is fixed at a first potential to be produced by said first selector circuit means, a second combination of voltage levels of said pair of display data signals causes a second output signal which is fixed at a second potential to be produced by said first selector circuit means, a third combination of voltage levels of said pair of display data signals causes a third output signal which is a rectangular wave signal alternating between said first and second potentials to be produced by said first selector circuit means, and a fourth combination of voltage levels of said pair of display data signals causes a fourth output signal which is a rectangular wave signal alternating between said first and second potentials and differing in phase by one hundred and eighty degrees with respect to said third output signal to be produced by said first selector circuit means.

5. A drive system for a liquid crystal display device according to claim 4, in which second selector circuit means produces first, second, third and fourth segment signals respectively in response to said first, second, third and fourth output signals of said first selector circuit means, with said first, second, third and fourth segment signals differing in phase with respect to one another by a predetermined amount.

6. A drive system for a liquid crystal display device according to claim 5, in which said pair of display segments corresponding to said pair of display data signals are responsive to a first one of said segment signals in conjunction with said digit signals for both attaining a continuous non-excited condition, are responsive to a second one of said segment signals in conjunction with said digit signals for both attaining a periodically excited condition, are responsive to a third one of said segment signals in conjunction with said digit signals for attaining a condition in which a first one of said pair of display segments is continuously non-excited while a second one of said pair of display segments is periodically excited, and are responsive to a fourth one of said segments signals in conjunction with said digit signals for attaining a condition in which said first one of the pair of display segments is periodically excited while said second one of the display segments is continuously non-excited.

7. A drive system for a liquid crystal display device according to claim 1, and further comprising compensation circuit means for selectively adjusting the duty cycle of said control signal, for thereby controlling the waveforms of said digit signals and said segment signals to provide a desired duty cycle for the periodic excitation of selected display segments of said liquid crystal display device.

8. A drive system for a liquid crystal display device according to claim 7, in which said compensation circuit means selectively connects particular ones of said periodic signals to said control circuit.

9. A drive system for a liquid crystal display device according to claim 7, in which said compensation circuit means is manually adjusted to thereby connect selected ones of said periodic signals to said control circuit.

10. A drive system for a liquid crystal display device according to claim 7, wherein said compensation circuit means comprises:

temperature sensing means;

selection control circuit means responsive to said temperature sensing means for producing selection signals; and selector means responsive to said selection signals for selecting periodic signals to be applied to said control circuit to generate said control signal;

for thereby automatically adjusting the duty cycle of excitation of selected segments of said liquid crystal display device to compensate for the effects of variations in the electrical characteristics of said liquid crystal display device caused by changes in operating temperature.

11. A drive system for a matrix type liquid crystal display device having a plurality of segment electrodes positioned to define a plurality of display figures and first and second digit electrodes, with each of said first and second digit electrodes being common to all of said display figures, comprising:

a periodic signal source providing a plurality of periodic signals of fixed frequency, each of said periodic signals being mutually different in frequency;

a control circuit responsive to selected ones of said periodic signals for producing a control signal composed of a rectangular wave signal;

means for supplying first, second and third reference voltages, with the difference in potential between said second and first reference voltages being greater than a threshold voltage level for excitation of said liquid crystal display device, and with the difference between said third and first reference voltages being less than said threshold voltage level;

a digit signal generating circuit having a distribution circuit coupled to receive said first, second and third reference voltages and responsive to said control signal for alternately providing said first and second reference voltages at a first output terminal thereof and for alternately providing said first and third reference voltages at a second output terminal thereof, a switch control circuit responsive to selected ones of said periodic signals for producing control signals, and a plurality of switching elements comprising a first pair of switching elements each having an input terminal coupled to receive said first reference voltage and a control terminal coupled to receive a selected one of said control signals, a second pair of switching elements each having an input terminal coupled to said first output terminal of the distribution circuit, and a control terminal coupled to receive a selected one of said control signals, and a third pair of switching elements each having an input terminal coupled to said second output terminal of the distribution circuit and a control terminal coupled to receive a selected one of said control signals, with output terminals of a first one of said first pair of switching elements, a first one of said second pair of switching elements and a first one of said third pair of switching elements being connected in common to a first output terminal of said digit signal generating circuit for thereby producing a first digit signal, and a second one of said first pair of switching elements, a second one of said second pair of switching elements and a second one of said third pair of switching elements being connected in common to a second output terminal of said digit signal generating circuit, for thereby producing a second digit signal, with each of said first and second digit signals thereby comprising a square wave signal alternating between said first, second and third voltage levels in a predetermined sequence, said predetermined sequence being periodically repeated, and with the periodic repetitions of said predetermined sequence in said first and second digit signals differing in phase, said first and second digit signals being applied to said first and second digit electrodes respectively;

a segment signal generating circuit composed of a display data source for producing a pair of display data signals, a first selector circuit responsive to selected ones of said periodic signals and to first, second, third and fourth combinations of voltage levels of said pair of display data signals for producing first, second, third and fourth output signals respectively, a gate circuit controlled by said control signal for selectively passing said selected ones of the periodic signals, and a second selector circuit responsive to said periodic signals passed by said gate circuit in conjunction with said first, second, third and fourth output signals of the first gate means for producing first, second, third and fourth segment signals respectively, each of said segment signals comprising a rectangular wave signal alternating between said first and third reference voltage levels in a periodically repeated sequence, with the periodic repetitions of said first, second, third and fourth segment signals being mutually different in phase;

said segment signals being applied in common to a pair of segment electrodes of said liquid crystal display device comprising a first segment electrode disposed adjacent and opposite to said first digit electrode and a second segment electrode disposed adjacent and opposite to said second digit electrode, whereby first and second display segments corresponding to said first and second segment electrodes are both periodically excited by said first segment signal in conjunction with said digit signals, only said first display segment is periodically excited by said second segment signal in conjunction with said digit signals, and only said second display segment is periodically excited by said third segment signal in conjunction with said digit signals.

12. A drive system for a liquid crystal display device in which a plurality of digit electrodes and a plurality of segment electrodes are arrayed in a matrix configuration, comprising:

a periodic signal source providing a plurality of periodic signals;

a control circuit responsive to selected ones of said plurality of periodic signals to provide a control signal;

a digit signal generating circuit including a distribution circuit responsive to said control signal and providing a plurality of reference voltages, a switch control circuit responsive to the other selected ones of said periodic signals to provide a plurality of switch control signals, and a plurality of switching elements responsive to said switch control signals and selected ones of said reference voltages to provide a plurality of digit drive signals to be applied to said digit electrodes, respectively, said digit drive signals being different in phase from one another and each having said reference voltages in a predetermined sequence; and a segment signal generating circuit composed of a display data source generating a plurality of display information signals, first selector circuit means responsive to said display information signals and first and second ones of said other selected ones of said periodic signals to select one of said display information signals and provide first output signals, gate circuit means responsive to said control signal and third and fourth ones of said other selected ones of said periodic signals to provide second output signals, and second selector circuit means responsive to said first output signals to select one of said third and fourth ones of said selected ones of said periodic signals and provide segment drive signals to be applied to said segment electrodes said segment drive signal being different in phase from one another.

* * * * *